United States Patent
Nguyen et al.

(10) Patent No.: US 9,311,472 B2
(45) Date of Patent: Apr. 12, 2016

(54) METHODS AND APPARATUS FOR AUTHENTICATING USER LOGIN

(71) Applicants: Dan Due Nguyen, Frisco, TX (US); Jon David Pfeffer, Lewisville, TX (US); Adam Levar, Northbrook, IL (US)

(72) Inventors: Dan Due Nguyen, Frisco, TX (US); Jon David Pfeffer, Lewisville, TX (US); Adam Levar, Northbrook, IL (US)

(73) Assignee: ABBOTT LABORATORIES, Abbott Park, IL (US)

( * ) Notice: Subject to any disclaimer, the term of this patent is extended or adjusted under 35 U.S.C. 154(b) by 20 days.

(21) Appl. No.: 13/725,050

(22) Filed: Dec. 21, 2012

(65) Prior Publication Data

US 2014/0181957 A1     Jun. 26, 2014

(51) Int. Cl.
*G06F 21/36*     (2013.01)

(52) U.S. Cl.
CPC ........................................ *G06F 21/36* (2013.01)

(58) Field of Classification Search
CPC ....................................................... G06F 21/36
USPC ........................................................... 716/19
See application file for complete search history.

(56) References Cited

U.S. PATENT DOCUMENTS

| | | | |
|---|---|---|---|
| 5,777,902 A | 7/1998 | Ono et al. | |
| 6,118,872 A | 9/2000 | Kashima et al. | |
| 6,246,966 B1 | 6/2001 | Perry | |
| 6,718,471 B1 | 4/2004 | Kashima | |
| 7,073,067 B2 | 7/2006 | Mizrah | |
| 7,188,314 B2 | 3/2007 | Mizrah | |
| 7,219,368 B2 | 5/2007 | Juels et al. | |
| 7,243,239 B2 | 7/2007 | Kirovski et al. | |
| 7,577,987 B2 | 8/2009 | Mizrah | |
| 7,644,433 B2 | 1/2010 | Mizrah | |
| 7,734,930 B2 | 6/2010 | Kirovski et al. | |
| 8,127,141 B2 | 2/2012 | Hypponen | |
| 8,141,146 B2 * | 3/2012 | Ozeki | 726/21 |
| 8,336,086 B2 | 12/2012 | Seo | |
| 8,352,745 B2 | 1/2013 | McKeeth | |
| 2002/0029341 A1 * | 3/2002 | Juels et al. | 713/184 |
| 2003/0093699 A1 | 5/2003 | Banning et al. | |
| 2004/0010721 A1 | 1/2004 | Kirovski et al. | |

(Continued)

FOREIGN PATENT DOCUMENTS

| | | |
|---|---|---|
| EP | 0901060 | 3/1999 |
| EP | 0947908 | 10/1999 |

(Continued)

OTHER PUBLICATIONS

International Searching Authority, "International Search Report and Written Opinion of the International Searching Authority," issued in connection with corresponding International patent application No. PCT/US2013/074644, mailed on Feb. 6, 2014, 9 pages.

(Continued)

*Primary Examiner* — Dede Zecher
*Assistant Examiner* — Jason C Chiang
(74) *Attorney, Agent, or Firm* — Hanley, Flight & Zimmerman, LLC

(57) ABSTRACT

Example methods and apparatus for authenticating a user login are disclosed herein. An example method includes displaying an image and dynamically presenting symbols adjacent the image. The example method includes receiving a code, the code formed by an arrangement of one or more of the symbols on the image. The example method includes authenticating a user based on the code.

28 Claims, 11 Drawing Sheets

(56) References Cited

U.S. PATENT DOCUMENTS

| | | |
|---|---|---|
| 2004/0119746 A1 | 6/2004 | Mizrah |
| 2004/0123151 A1 | 6/2004 | Mizrah |
| 2004/0123160 A1 | 6/2004 | Mizrah |
| 2004/0225899 A1 | 11/2004 | Mizrah |
| 2004/0230843 A1 | 11/2004 | Jansen |
| 2005/0044425 A1 | 2/2005 | Hypponen |
| 2005/0071686 A1* | 3/2005 | Bagga et al. ............... 713/202 |
| 2007/0277224 A1* | 11/2007 | Osborn et al. ............... 726/2 |
| 2008/0016369 A1 | 1/2008 | Kirovski et al. |
| 2008/0050280 A1 | 2/2008 | Fujita |
| 2008/0222710 A1* | 9/2008 | Blagsvedt et al. ........... 726/7 |
| 2008/0271122 A1* | 10/2008 | Nolan et al. ............... 726/4 |
| 2009/0038006 A1* | 2/2009 | Traenkenschuh et al. ...... 726/21 |
| 2009/0116753 A1 | 5/2009 | Midgley et al. |
| 2010/0011419 A1* | 1/2010 | Seo ............... 726/5 |
| 2010/0083353 A1* | 4/2010 | Wang ............... 726/5 |
| 2010/0117792 A1* | 5/2010 | Faith et al. ............... 340/5.81 |
| 2010/0325177 A1* | 12/2010 | Hibino et al. ............... 707/812 |
| 2011/0016520 A1* | 1/2011 | Cohen et al. ............... 726/19 |
| 2011/0029902 A1* | 2/2011 | Bailey ............... 715/764 |
| 2011/0119629 A1* | 5/2011 | Huotari et al. ............... 715/836 |
| 2012/0005483 A1* | 1/2012 | Patvarczki et al. ............... 713/182 |
| 2012/0011564 A1 | 1/2012 | Osborn et al. |
| 2012/0159608 A1* | 6/2012 | Griffin et al. ............... 726/16 |
| 2012/0198544 A1 | 8/2012 | McKeeth |
| 2012/0272311 A1* | 10/2012 | Althammer et al. ............... 726/16 |
| 2013/0347087 A1* | 12/2013 | Smith ............... 726/7 |

FOREIGN PATENT DOCUMENTS

| | | |
|---|---|---|
| EP | 2466521 | 6/2012 |
| WO | 2007042857 | 4/2007 |
| WO | 2008010822 | 1/2008 |
| WO | 2010104914 | 9/2010 |

OTHER PUBLICATIONS

Jansen, "Authenticating Mobile Device Users Through Image Selection," The National Institute of Standards and Technology, International Conference on The Internet Society, May 2004, 10 pages.

Eljetlawi, "Study and Develop a New Graphical Password System," Masters Thesis, Universiti Teknologi, Malaysia, Nov. 2008, 144 pages.

Kim, et al., "Multi-Touch Authentication on Tabletops," CHI 2010: Input, Security, and Privacy Policies, Apr. 10-15, 2010, 10 pages.

Feher, et al., "User Identity Verification via Mouse Dynamics," Information Sciences, vol. 201, Oct. 15, 2012, 34 pages.

Arrington, "Android's Login Is Cool, But Is It Secure?" TechCrunch, http://techcrunch.com/2008/10/12/androids-login-is-cool-but-is-it-secure/, Oct. 12, 2008, 3 pages.

"Android style login screen for iPhone apps," YouTube, http://www.youtube.com/watch?v=xIIIT2M_Ijk, Jun. 5, 2010, 2 pages.

"Windows 8 will offer touch input login," TechnoMoot, The Tech Guide, http://web.archive.org./web/20110502064638/http://technomoot.com/2011/04/28/windows-8-will-offer-touch-input-login.html, Apr. 28, 2011, 5 pages.

Kutty, "Microsoft developing new way to login on tablets," TopNews, http://www.topnews.in/microsoft-developing-new-way-login-tablets-2350046, Dec. 24, 2011, 8 pages.

International Preliminary Report on Patentability, issued by the International Searching Authority in connection with International patent application No. PCT/US2013/074644, mailed on Jul. 2, 2015, 6 pages.

* cited by examiner

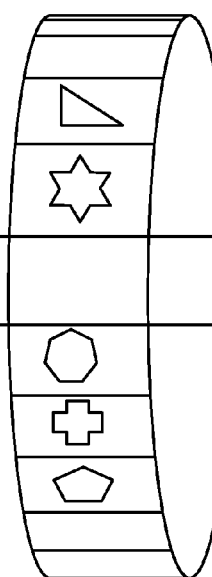
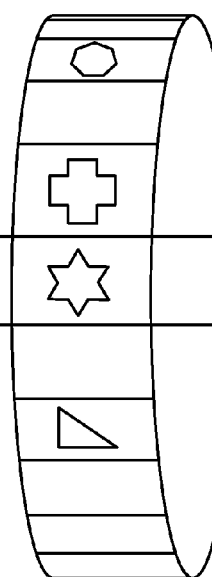
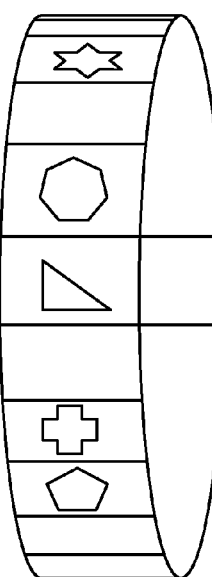
FIG. 3c
FIG. 3d

METHODS AND APPARATUS FOR AUTHENTICATING USER LOGIN

FIELD OF THE DISCLOSURE

The present disclosure relates generally to authentication systems and, more particularly, to methods and apparatus for authenticating a user login on a computing device.

BACKGROUND

Healthcare diagnostics labs employ a variety of diagnostic instruments such as those for testing and analyzing specimens or samples. These diagnostic instruments often track a chain of custody throughout a process of testing samples and releasing results. To track the chain of custody, known systems use a specific user login at each step in the testing process. These systems require a user (e.g., a lab technician) to log into the system by entering a username and password via a keyboard.

Lab technicians, who work in healthcare diagnostics labs, typically wear/use safety gloves, goggles, lab coats, gas masks and other personal protection equipment (PPE) when operating the diagnostic instruments. Many of the samples and reagents used in the healthcare diagnostics labs contain biohazardous material and/or other hazardous substances. Lab technicians may be reluctant to use (and incapable of typing on) a keyboard when wearing gloves, especially when the lab technician has been handling hazardous materials. Additionally, during testing operations, many lab technicians carry samples, reagents, notebooks or other instruments and, as a result, are reluctant or incapable of typing on a keyboard with two hands. Thus, some lab technicians find compliance with login requirements to be cumbersome. Therefore, users often share a common user account (i.e., only one user logs into the system initially and others use the same user account) or do not log into the system, which creates difficulties when tracking the chain of custody.

SUMMARY

An example method includes displaying an image and dynamically presenting symbols adjacent the image. The example method includes receiving a code, the code formed by an arrangement of one or more of the symbols on the image. The example method includes authenticating a user based on the code.

Another example method includes displaying an image including lock locations in a first position on a screen. The example method includes displaying a first set of key symbols in a first arrangement adjacent the image. The example method includes receiving a code comprising an association of at least one of the key symbols and at least one of the lock locations. In this example, at least two key symbols are associated with a same one of the lock locations. The example method includes authenticating a user based on the code.

Also disclosed herein is an apparatus including a user interface to display a login screen to a user and an input device to receive a command from the user. The example apparatus includes a processor communicatively coupled to the user interface. The processor is to present a plurality of lock locations to the user and present a plurality of symbols to the user. The processor is also to request the user, using the input device, to enter a code comprising matching one or more of the symbols to one or more of the lock locations. The processor is to authenticate the user based on the code. In this example, at least one lock location is to be matched with more than one symbol.

BRIEF DESCRIPTION OF THE DRAWINGS

FIG. 3c illustrates an alternative example login screen with dynamically displayed keys.

FIG. 3d illustrates another alternative example login screen with dynamically displayed keys.

DETAILED DESCRIPTION

Figure 1:
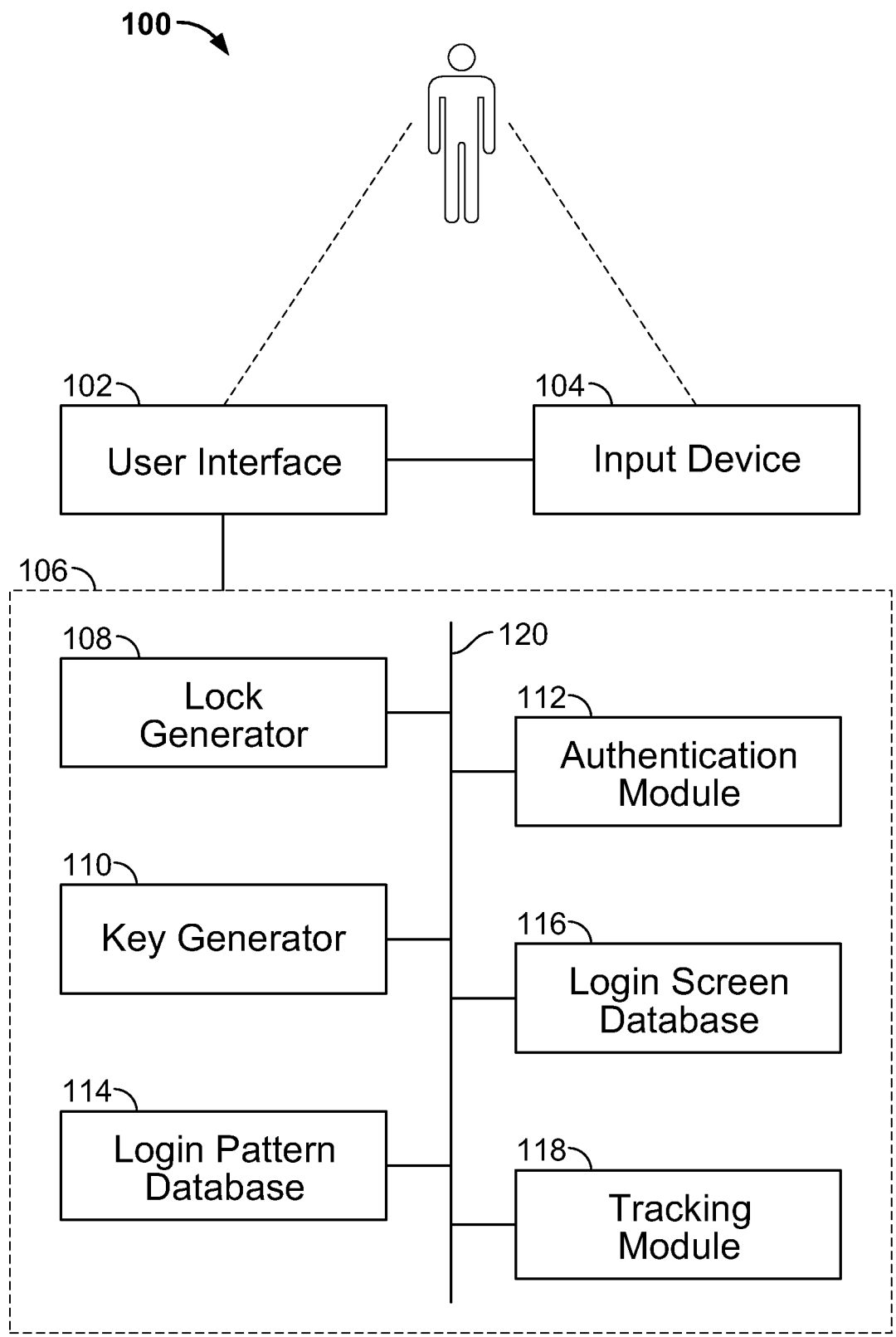
FIG. 1 is a block diagram of an example authentication system.

Although this specification discloses example methods, apparatus and machine readable media including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such apparatus and methods.

Healthcare diagnostics laboratories employ a variety of diagnostic instruments to test and analyze samples and/or specimens. In some examples, the diagnostic instruments request a user login to track a chain of custody (i.e., track the people who operate the instruments and handle the samples used in such operations). Some user login systems request a user to login using a user name and password via a keyboard. Lab technicians may be reluctant or unable to use a keyboard or other computing device when wearing PPE and/or handling hazardous materials.

Some known systems utilize a radio frequency identification (RFID) tag to identify and authenticate a user. However, these systems require additional badges, software, hardware and other components to employ the RFID technology. Further, lab technicians may remain reluctant to use RFID badges because of contamination and, therefore, one lab technician may sign in and others may operate using the same user account, thereby preventing the generation of a proper chain of custody record.

Other known systems use biometric data such as, for example, an iris scan or a fingerprint scan. However, because lab technicians typically wear gloves, goggles, and other PPE, user authentication and chain of custody establishment through biometrics is difficult to employ. Further, these systems also require additional hardware, such as an iris scanner, a fingerprint scanner and/or other hardware token generators.

The example user authentication methods and apparatus disclosed herein enable a user to log into a computing device (e.g., a desktop computer, an instrument, a workstation, a laptop computer, a tablet, a smart phone, etc.) and/or software application via a touch input or pointing device (e.g., mouse) without the use of a keyboard. This enables lab technicians to easily login while wearing gloves and/or other PPE and, thus, increases compliance with chain of custody procedures. The example instrumentation and/or software application(s) disclosed herein may include, for example, instrumentation and/or software related to hematology, blood banks, immunoassay, and/or any other type of diagnostic equipment and/or other purposes in the field of healthcare, forensics, laboratories, research facilities, bookkeeping, or other fields. Further, the example authentication methods and apparatus disclosed herein may be incorporated into any existing security systems such as, for example, the Lightweight Directory Access Protocol (LDAP).

The example user authentication methods and apparatus disclosed herein enable a user to create a login pattern (e.g., an arrangement of symbols on an image) using a plurality of graphic objects such as keys (e.g., symbols, icons, characters, etc.) and locks (e.g., locations on an image where the keys may be arranged). Thus, the user can personalize the password content and the spatial and/or temporal arrangement of the password content. When entering the password, the user associates (e.g., by inserting, placing, or matching) the keys with various locks (e.g., locations on an image) to create a login pattern (e.g., a code, a set of nested ordered pairs, and/or a sequence of tuples). The example user authentication methods and apparatus disclosed herein also create a more secure and intuitive login system with multiple combinations of user-defined locks and keys.

The secure login methods and apparatus disclosed herein also reduce the risk of a person logging in as another person because of ease of use to all users (described in further detail below) which, as a result, increases the accuracy of chain of custody records in a laboratory environment. In addition, the secure login system disclosed herein may also be used to restrict access to certain software applications. Furthermore, in some examples, for heightened security, when subsequently logging into a computer device or a software application, a user may be asked to correctly repeat the login pattern by duplicating the pattern of associating keys and locks. If the login pattern is correct, access to the computing device or software application is granted.

There are many additional advantages to the examples disclosed herein. For example, the example methods and apparatus are more secure because of the multitude of possible locks and keys that may be used. Also, the keys presented on the user login screen may include more unique symbols than a standard keyboard. Further, the example methods and apparatus present the keys and locks in different arrangements (e.g., static, dynamic) and in different areas of the screen to minimize unauthorized activity (e.g., people who attempt to circumvent security and login as another person using streak marks or other residue on a touch screen to determine what keys and locks a user is using). The example methods and apparatus increase operational compliance and help to maintain accreditation. The example methods and apparatus also create a larger surface for users with gloves and allow a user to operate the example system with a single hand.

Turning now to the figures, FIG. 1 is a block diagram representing an example authentication apparatus or system in accordance with the teachings of this disclosure. The authentication system 100 includes a user interface 102, an input device 104 and a processor 106. The processor 106 includes a lock generator 108, a key generator 110, an authentication module 112, a login pattern database 114, a login screen database 116 and a tracking module 118 communicatively coupled via communication links 120 such as, for example a bus or any other suitable wired or wireless communication link(s). The example authentication system 100 allows a user to create a login pattern and determines, during subsequent login attempts, if the login pattern has been entered correctly.

The user interface 102 may be, for example, a video display (e.g., a computer monitor, a television, a diagnostics instrument display, a tablet, a touch screen monitor, etc.) and/or any other user interactive display capable of presenting a login screen and accepting user input. The input device 104 may be, for example, a mouse, a touch screen on the user interface 102, a keyboard, a laser pointer, a microphone and/or any other device capable of allowing a user to control aspects of the user interface 102.

To create a login pattern, the authentication system 100 presents one or more lock(s) (e.g., a specific location on a display screen) and one or more key(s) (e.g., symbols, key symbols, icons, etc.) to the user via the user interface 102. In some examples, the system 100 includes a unique login screen for each of a plurality of users. In some such examples, a user chooses a user name (e.g., a screen name, an avatar), via a user identification screen, which the system 100 uses to identify the corresponding login screen to present to the user for entry of the user's login pattern (e.g., code). In some examples, the user selects his or her login screen. In other examples, the system 100 presents a single type of login screen for use by multiple users. In such examples, each user creates an individual login pattern that includes a unique sequence of associating one or more key(s) and one or more lock(s). Thus, the login pattern is an arrangement of symbols on locations of a display screen (e.g., on an image).

In some examples, the system 100 enables the user to select a type of login screen, and the lock generator 108 specifies the locations of the locks (e.g., specific locations with which a key is to be associated) on the login screen. In the example shown, the login screens are stored in the login screen database 116. In some examples, the login screen includes predetermined lock locations such as, for example, a 3×3 array or grid, where each block of the grid is a lock (e.g., a space or region on the screen with which a key may be associated). Other example login screens with predetermined lock locations include an image such as, for example, a pattern, a scene, and/or an image of one or more object(s), with one or more locations overlaid with the image. Another example login screen with predetermined lock locations includes three-dimensional (3-D) appearing images, where the locks may be presented on one or more side(s) of the 3-D appearing image.

In some examples, a lock location only receives a particular key based on a specific user's login pattern. For example, one user may have a password that starts with a '#' symbol in a particular position (i.e., lock). Another user may have a password that starts with a '&' symbol. Other users may have a password that is to include a number in the third position or location. In these examples, the lock locations are analogous to mechanical locks (e.g., pad locks), in that they receive any key, but only the correct key will unlock the system (e.g., the user's login pattern and corresponding key-to-lock combination). In other examples, the lock locations are more permissive and accept any sort of key designated by the user when designing the user's authentication code (login pattern). In such examples, a user may not have to use a number as a key, for example, in a specific lock but allows the use of any number, letter, or symbol as the key for any lock.

In some examples, the login screen does not include predetermined lock locations. In some such examples, an image is presented and the user chooses locations on the screen for one or more lock(s) (e.g., locations on the screen with which a key may be associated). In some examples the processor 106 generates an image for use in the login screen and, in other examples, the user may upload his/her own image and arrange one or more lock(s) on the image. The lock generator 108 allows the user to specify where the locks are to be located on the login screen. In other examples, the key generator 110 overlays predetermined lock locations on a user's image (e.g., a 3×2 grid of locks overlaid on top of a picture of a car). The user of a custom image may assist in reminding the user of his/her login pattern. In the example shown, the login screen database 116 stores the login screens and corresponding lock locations.

Once the user has selected a login screen, the user specifies a login pattern comprising one or more key(s) and/or a particular order or sequence of the one or more key(s). The key generator 110 presents a plurality of keys (e.g., symbols, graphics, icons, characters, etc.) to the user via the user interface 102. The keys are used to create the login pattern (e.g., code). In some examples, the login pattern includes one or more key(s) placed in or associated with one or more lock(s). In other examples, multiple keys are associated with the same lock. In other examples, the same key is associated with multiple locks and/or into the same lock multiple times. In some examples, all of the locks are not to be used. In some examples, the order (e.g., sequence) of the keys associated with the locks is also part of the pattern or code and, therefore, used to authenticate the user. In some such examples, the login pattern may include associating a key with a lock and then subsequently disassociating the key with that lock (e.g., placing a key in a lock and then removing the key from that lock). In other examples, the temporal order of key placement is not part of the authentication process, and the user may be authenticated when all the keys of the code are associated with respective locks, regardless of the order in which they are associated. In the example shown, login patterns are stored in the login pattern database 114.

The example system 100 saves the login pattern or code corresponding to the user. To authenticate a user and log into a computing device and/or software application, the system 100 prompts or otherwise requests the user to enter his/her login pattern or code. In some examples, the user specifies his/her user name (e.g., via a screen name or avatar) and the system presents the user's login screen. In some such examples, the system 100 may also present the user with multiple login screens (e.g., a 3×3 grid, a 4×4 grid, etc.) and the user selects his/her login screen accordingly. In this example, requesting the user to choose his/her login screen from a plurality of login screens increases the security of the system because an additional step is needed in the authentication process. In other examples, the multiple users use the same login screen type.

In operation, the lock generator 108 and the key generator 110 present the user with one or more lock(s) and the one or more key(s). The user associates the key(s) with the lock(s). In some examples, the user may associate a key with a lock by placing the keys in the locations of the locks on the login screen (e.g., by placing the keys over the locks). In some examples, not all of the presented keys are used in the user's code. In some examples, the same key is associated with multiple locks and/or multiple keys are associated with the same lock. In some examples, the user's login pattern includes associating the keys with their respective locks in a specific sequence or order. In some examples, the sequence includes associating a key with a lock and then subsequently disassociating that key with the lock. The authentication module 112 analyzes the lock and key combination input by the user to determine if the user has correctly entered his/her login pattern or code. In some examples, the authentication module 112 compares the entered login pattern with the user's login pattern stored in the login pattern database 114. If the user has entered the login pattern correctly, the system 100 grants access to the computing device and/or software application(s). In some examples, access is granted automatically once the correct login pattern is entered. In other examples, the user must enter his/her login pattern and then perform some additional action such as, for example, pressing enter or 'DONE' or 'LOGIN.' If the user does not enter the login pattern correctly, access is denied. Some examples include a time-out feature in which the system 100 automatically locks or logs a user out of the computing device and/or software application if he/she is inactive for a predetermined period of time. To regain access, the user may have to reenter his/her login code. Once the user has logged on correctly and been authenticated, the tracking module 118 creates a record of the user and his/her identification, the operation of the instrument or application(s), identification of sample(s) and/or any other suitable data for tracking a chain of custody.

Figure 2A:
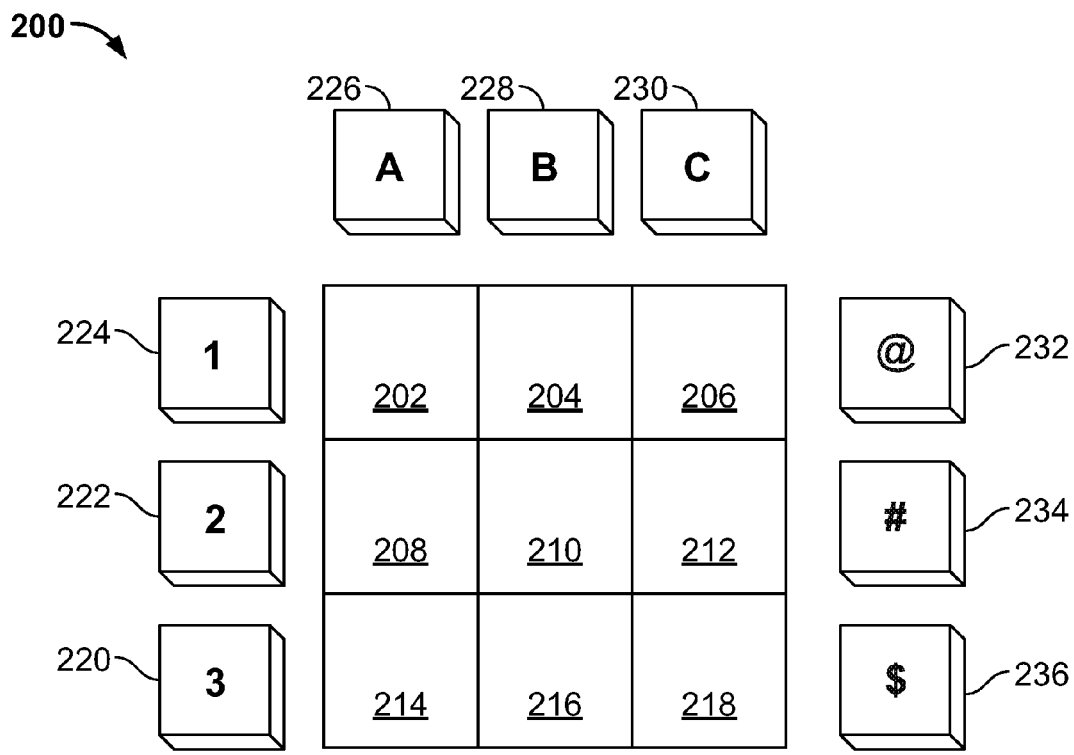
FIG. 2a illustrates an example login screen.

FIG. 2a shows an example authentication login screen 200 that includes a plurality of locks 202, 204, 206, 208, 210, 212, 214, 216 and 218 arranged in a 3×3 grid (e.g., each square of the grid is a graphic representing a location with which a key may be associated). In some examples, the login screen 200 includes more or fewer locks. In other examples, the locks may be arranged in any pattern, as described in detail below. In some examples the locks are presented in a predetermined geometric arrangement positioned on an image, a background and/or a pattern on the login screen 200. In some examples, the locks are represented symbolically by icons, images, numbers, characters (any language), colors, two-dimensional shapes, and/or three-dimensional models.

As shown in FIG. 2a, the login screen 200 also includes a plurality of keys 220, 222, 224, 226, 228, 230, 232, 234 and 236. In some examples, the login screen 200 may include more or fewer keys. In the example shown, the keys 220-236 are arranged in groups of three surrounding (e.g., adjacent) the locks 202-218. In the example shown, the keys 220-236 include/represent distinct symbols (e.g., A, B, C, 1, 2, 3, @, #, $, etc.). However, in other examples, the keys are symbolically represented by any icon, image, number, character (any language), color, two-dimensional geometric shape, and/or three-dimensional object model, etc.

In FIG. 2a, the login screen 200 has predetermined lock locations (e.g., locations with which a key may be associated), and the locks 202-218 are arranged in the 3×3 grid. When creating a login pattern, a user may associate any of the keys and any of the locks (e.g., by placing a key over a lock or lock location). In some examples, the system requires the login pattern to contain a minimum number of unique locks. For example, if a system requires at least three unique locks, a user may create a login pattern using one key in the locks 202, 210 and 218, or multiple keys in the locks 202, 210 and 218. Therefore, associating two keys with the lock 202 and one key with the lock 210 will not fulfill the minimum requirement of unique locks.

In some examples, the system places a limit on the maximum number of locks that may be used for a login pattern. For example, if the system has a maximum limit of four unique locks, a user may place a key in the locks 202, 210, 214 and 218. A user may place more than one key in each of these locks. However, a user cannot also place a key in the lock 216.

In some examples, the system requires a minimum number of keys and/or unique keys to be used when creating a login pattern. In other examples, the system places a limit on the maximum number of keys and/or unique keys that may be used when creating a login pattern. In some examples, more than one key is placed into the same lock. In some examples, a given key is placed into the same lock multiple times and/or other locks multiple times. In some examples, the system places a limit on the number of keys that may be placed into a given lock.

In some examples, the system uses a fixed number of keys, and the system automatically authenticates a user without further input once the keys are inserted into the locks. For example, the system could set the number of keys for a login pattern to four, and once the fourth correct key is placed in a lock location, the system grants access. In other examples, the login pattern is entered and additional action is to be completed to authenticate a user (e.g., pressing enter, DONE, SUBMIT, LOGIN, etc.). In some examples, the locks 202-218 and/or the keys 220-236 are large enough for a user to touch with a glove such as, for example, when the login screen 200 is displayed on a touch screen.

Figure 2B:
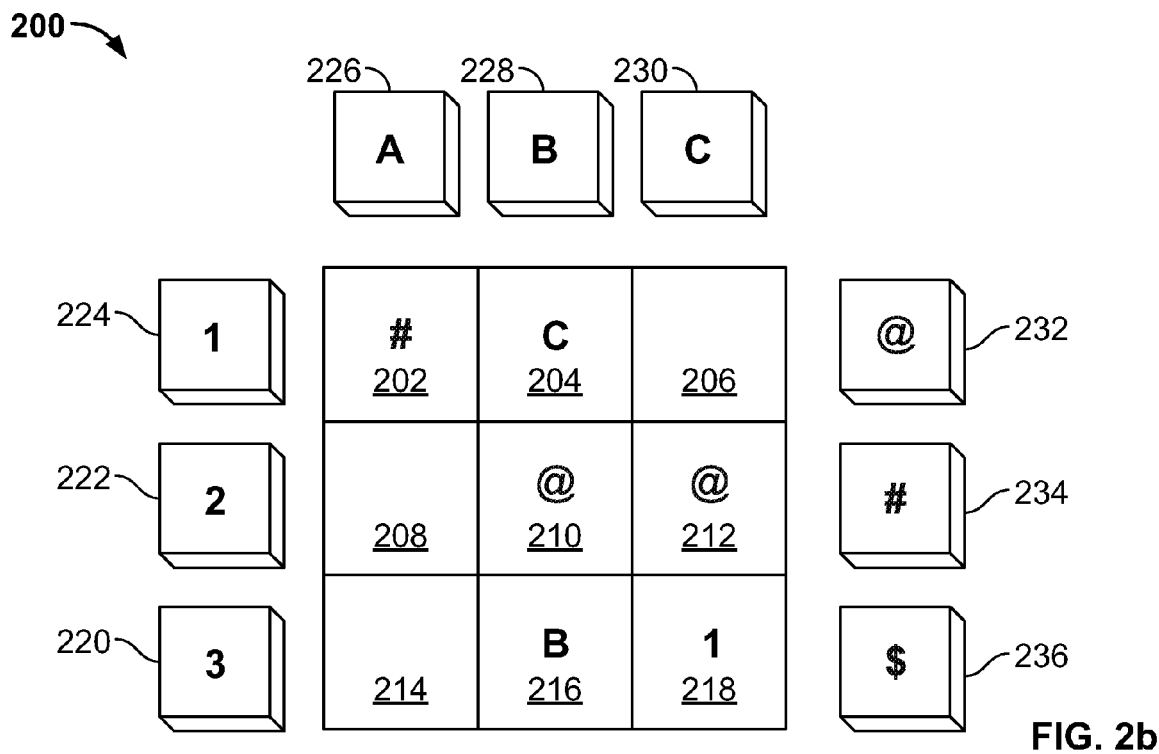
FIG. 2b illustrates the example login screen of FIG. 2a showing example keys inserted into example locks.

FIG. 2b shows the example login screen 200 of FIG. 2a after a number of keys have been associated with certain locks when, for example, creating a login pattern or entering a login pattern (e.g., code) to authenticate a user. To create a login pattern, a user may, for example, specify a user name (e.g., identification) and choose a login screen corresponding to the user name. For example, user "Bob" may choose a 3×3 lock grid for his login screen while user "Jane" may choose 4×4 lock grid for her login screen.

After a user has selected a login screen, the user may create his/her login pattern. For example, if a user's login screen is the login screen 200, the user may create a login pattern by inserting one or more keys into one or more locks (e.g., by placing one or more keys over one or more lock locations). In the example login screen 200 shown, a user has inserted the key 234 into the lock 202, the key 230 into the lock 204, the key 232 into the lock 210 and the lock 212, the key 228 into the lock 216, and the key 224 into the lock 218. In some examples, to associate a key with a lock, a user touches the key (via an input device or touch screen) and drags the key to the location of the lock. In other examples, the user touches/clicks (e.g., single clicks, double clicks, etc.) the key and then touches/clicks the corresponding lock. In some such examples, the user subsequently touches multiple locks after touching/clicking the key to place the same key on multiple locks. In some examples, the authentication system requests the user to confirm his/her login pattern (i.e., reenter the key and lock pattern).

In some examples, the login pattern includes a specific order (e.g., sequence) in which the keys are to be associated with corresponding lock locations. For example, in FIG. 2b, the user associates the key 234 with the lock 202 first, the key 230 with the lock 204 second, the key 232 with the lock 210 third, the key 232 with the lock 212 fourth, the key 228 with the lock 216 fifth, and the key 224 with the lock 218 sixth. To authenticate the login, the user places the keys on the correct locks and in the correct order (i.e., the key 234 on the lock 202, the key 230 on the lock 204, the key 232 on the lock 210 and the lock 212, the key 228 on the lock 216, and the key 224 on the lock 218). In some examples, the login pattern includes associating a key with a lock and then disassociating a key with a lock. For example, the login pattern may include the order mentioned above and, additionally, associating the key 236 with the lock 214 and then subsequently disassociating the key 236 with the lock 214 (i.e., so the final login pattern appears as in FIG. 2b). In some examples, to disassociate a key with a lock, the user clicks and drags the key to an area outside the locks or touches/clicks the key and then touches/clicks the outside area of the locks (i.e., places the key back outside the locks). In other examples, associating keys with locks in a certain order is not necessary as long as the keys match their corresponding lock (i.e., a user may place the key 224 on the lock 218 first followed by the other keys in any order).

In some examples, the login screen 200 displays the keys on the locks after the keys have been placed on the locks. In other examples, the login screen 200 masks or otherwise obscures the keys once they are placed on the locks. In some examples, the login screen 200 may continue to show an empty lock even after a key has been placed to conceal the identity of the lock and key combination (e.g., after placing keys into locks, the login screen appears as in FIG. 2a). In some examples, when more than one key is placed into the same lock, the most recent key is displayed and covers (e.g., obscures) previously placed keys (e.g., if a user placed the key 226 on the lock 202 and then placed the key 234 on the lock 202, the login screen appears as in FIG. 2b, where only the top or most recent key is displayed). In some examples, when more than one key is placed into the lock, the keys are arranged in the lock such that each key is visible in the lock (e.g., small thumbnails arranged in the lock so all the keys are visible). In some examples, the keys 220-236 disappear from the outside of the image 202 after each has been used. In other examples, the keys 220-236 remain visible and are regenerative (e.g., every time a key is used the key remains visible and may be used multiple times).

In the example login screen 200 shown in FIGS. 2a and 2b, the keys 220-236 are arranged in groups of three around the locks 202-218. In some examples, the system presents the keys in a pre-determined order on the login screen 200. In other examples, the system presents the keys in a random order on the login screen 200. In some such examples, the keys are arranged in one order when a user first logs in and in a different order a second subsequent time the user logs in. The different presentation of keys makes it difficult to trace residue (e.g., oils) or smears on a touch screen in an attempt to recreate a user's login code without authorization. In addition, in some examples, the different keys may be presented to the user at different login sessions. In this example, the keys used in the user's code will be presented during each login session, but the remaining/additional keys may change between one or more of the presentations. Also, in some examples, the presentation of the locks may appear on different areas or locations of the screen. Thus, during a first login session, the locks (e.g., an image including lock locations) may appear in the upper left corner of the screen. In a subsequent login session, the locks may appear in the center. In other sessions, the locks may appear in other positions on the screen. Different presentation areas also inhibit unauthorized recreation of a login code through tracing marks (e.g., fingerprints) on a screen.

Figure 2C:
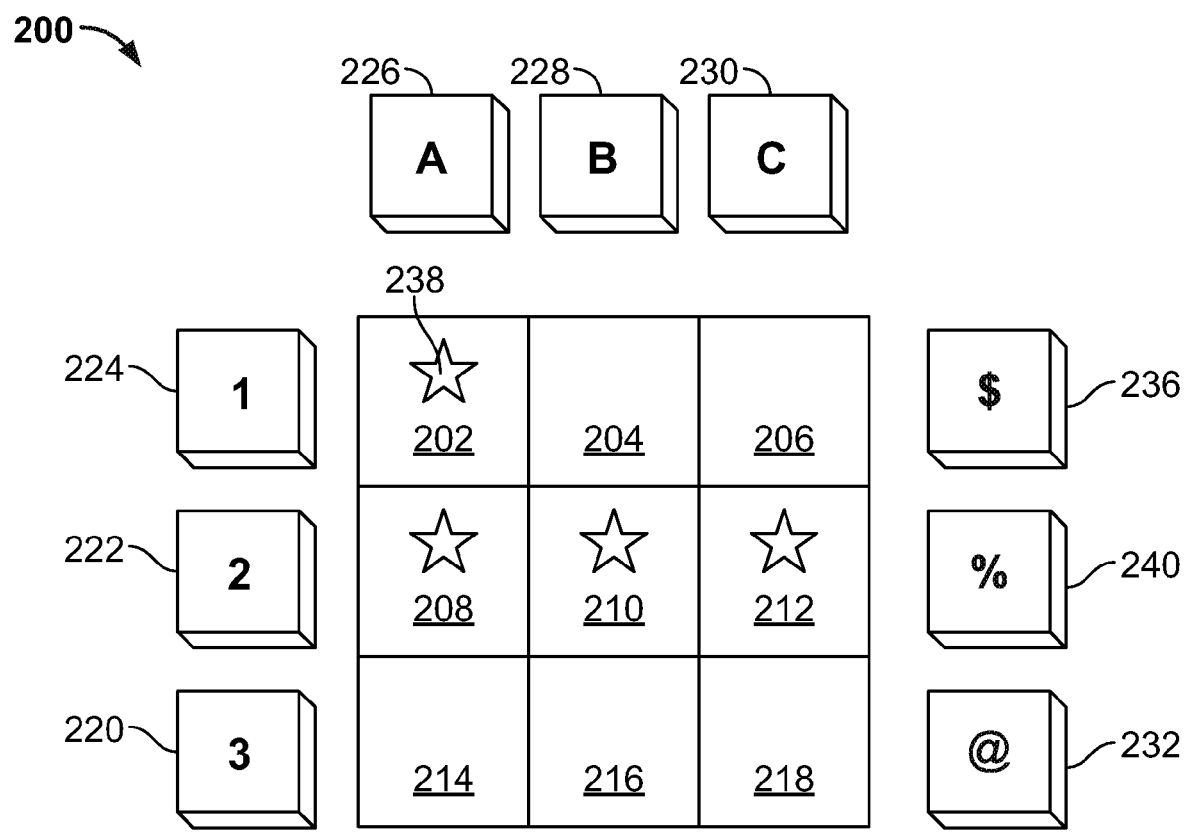
FIG. 2c illustrates the example login screen of FIG. 2a with masked keys.

FIG. 2c shows the example login screen 200 of FIGS. 2a and 2b after a number of keys have been inserted into the locks and masked. In the illustrated example, a mask 238 (e.g., an image other than the key) is displayed in the lock after keys have been inserted into the locks. The mask covers the keys to guard the identity of the user's keys and corresponding lock locations. In some examples, the mask may be an empty lock, an image, an icon, a symbol, a character, a geometric shape, or a representation of a three-dimensional model.

As shown in FIG. 2c, the keys are presented in a different arrangement (e.g., order, series) than presented in FIGS. 2a and 2b (e.g., the key 232 is now at the bottom right and the key 236 is now at the top right). As mentioned above, in some examples, the system presents the keys in different arrangements on the login screen 200 each time a user logs in. The different presentation of keys makes it difficult to trace residue (e.g., oils) or smears on touch screen in an attempt to recreate a user's login code without authorization. For example, the keys may be arranged in a first arrangement as in FIG. 2b (e.g., the key 232 is displayed at the top right and the key 236 is displayed at the bottom right) when a user first logs in and in a different order as in FIG. 2c (e.g., the key 232 displayed at the bottom right and the key 236 displayed at the top right) a second time the user logs in.

In some examples, the login screen includes a first set of keys (e.g., the keys 220-236 as in FIG. 2b) when the user first logs in and includes a second set of keys (e.g., the keys 220-232, a key 240 "%" and the key 236 as in FIG. 2c) when the user logs in a second time. In the examples shown in FIGS. 2a-2c, the set of keys includes the keys including the user's login code, but the remaining keys may be changed between the one or more presentations. For example, if the user's login code includes the key 220, the key 226, the key 230 and the key 236, the remaining keys 222, 224, 228, 232, and 234 (as shown in FIG. 2b) may changed between different presentations (e.g., as shown in FIG. 2c where the key 234 is now the key 240). In this example, the keys used in the user's code will be presented during each login session, but the remaining keys may change between one or more of the presentations. The variance in the arrangement and the set of keys presented makes it difficult to trace residue (e.g., oils, smudges) or smears on touch screen in an attempt to recreate a user's login code without authorization.

Figure 3A:
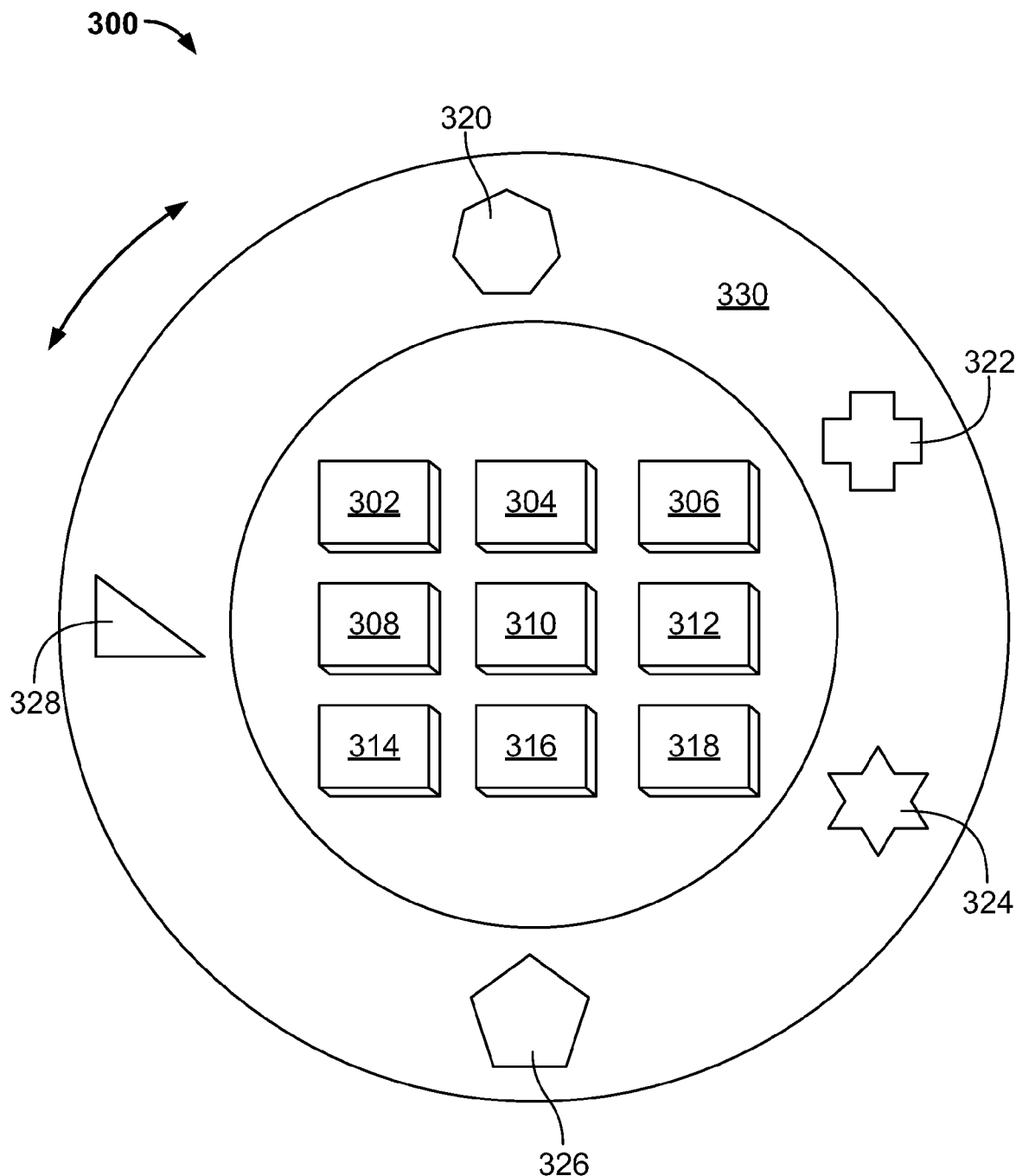
FIG. 3a illustrates an example login screen with dynamically displayed keys shown in a first position.

FIG. 3a shows an example of an authentication login screen 300 including a plurality of locks 302, 304, 306, 308, 310, 312, 314, 316 and 318 arranged in a 3×3 layout. A plurality of keys 320, 322, 324, 326 and 328 are located on a guide 330 outside of the locks 302-318. In the example shown, the keys 320-328 are represented by two-dimensional geometric shapes and the locks 302-318 are represented by three-dimensional appearing blocks. Similar to the login screen 200 described above, the keys 320-328 and/or the locks 302-318 may be represented symbolically by any icon, image, number, character (any language), color, two-dimensional geometric shape, and/or three-dimensional object model.

In the example shown, the keys 320-328 are dynamically presented (e.g., translate, moved, etc.) along the guide 330 around the outside of the locks 302-318. In the example shown, the keys 320-328 move in either direction along the guide 330 (i.e., clockwise or counterclockwise around the locks 302-318 and/or disappearing and reappearing). The keys 320-328 may move constantly or may have discrete movements in which the keys 320-328 move periodically or aperiodically. Also, in some examples, the keys 320-328 move in unison and in other examples one or more of the keys 320-328 move in an unsynchronized manner relative to other keys. The guide 330 operates as a path or track along which the keys 320-328 can move. In the example shown, the guide 330 is in the shape of a ring. However, in other examples, the guide may be represented by any shape, image, path, figure, etc. For example, the guide may be in the shape of a square and the keys 320-328 may translate along the sides of the square. In other examples, the guide may be represented by an image such as, for example, a river, wherein the keys 320-328 translate along the image of the river on the login screen 300. In other examples, any suitable shape of a guide may also be used such as, for example, a rectangle, a triangle, a figure-8, or an amorphous and/or random outline.

Figure 3B:
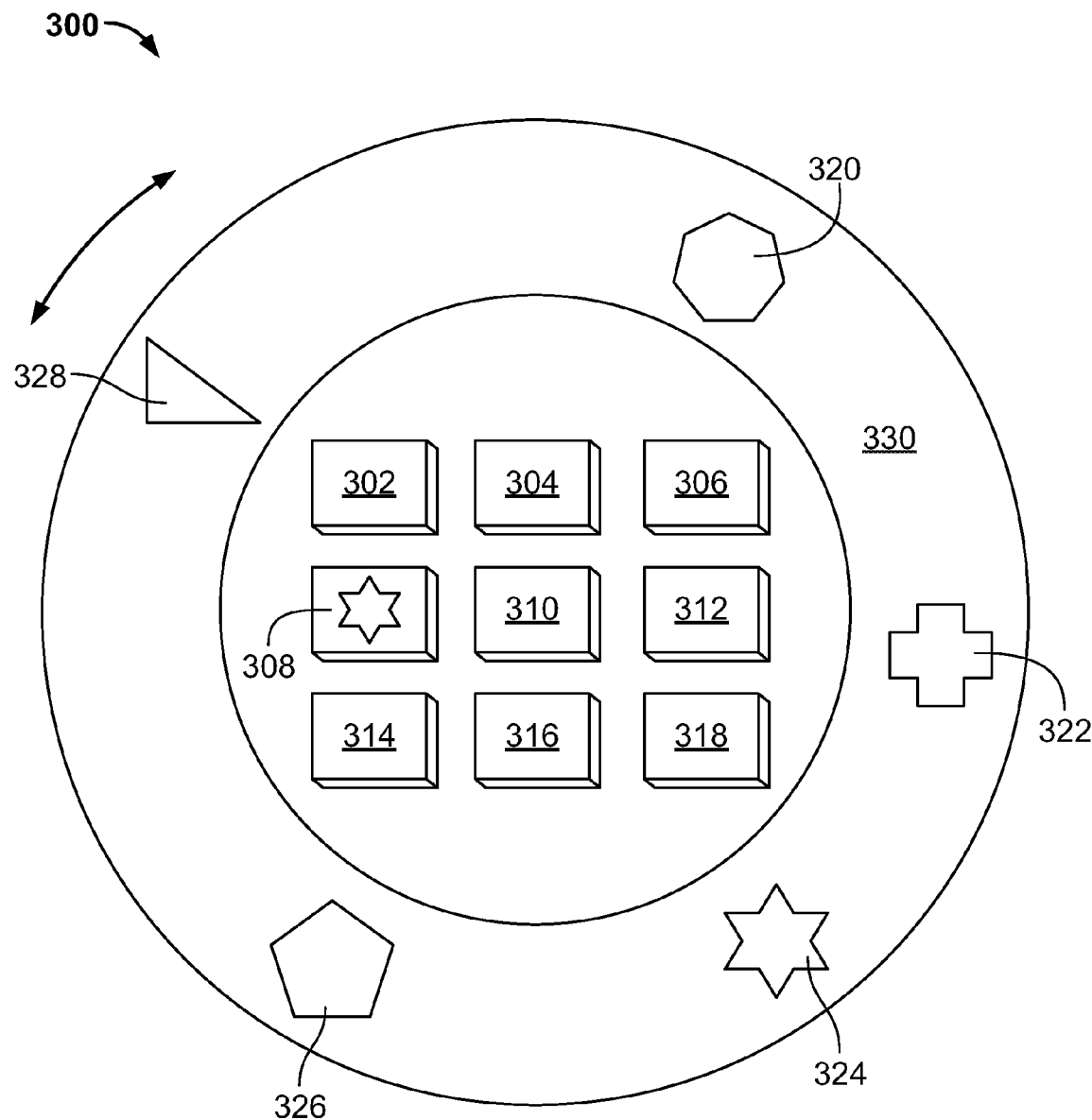
FIG. 3b illustrates the example login screen of FIG. 3a with the dynamically displayed keys shown in a second position.

FIG. 3b shows the example login screen 300 of FIG. 3a after the keys 320-328 are rotated on the guide 330 around the locks 302-318. As shown, the keys 320-328 have rotated clockwise along the guide 330. The key 324 has been associated with the lock 308. In the example shown, the keys 320-328 move at a speed that allows a user to click and/or drag the keys 320-328 onto their respective locks 302-318. To associate a key with a lock, a user may touch the keys 320-328 (via an input device or touch screen) and drag the keys 320-328 into the locks 302-318 or the user may touch/click the keys 320-328 and then touch/click the corresponding lock(s) 302-318. In some examples, the movement of the keys 320-328 is a continuous movement (i.e., the keys 320-328 move fluidly around along the guide 330). In other examples, the keys 320-328 move in discrete motion (e.g., the keys 320-328 skip from one position to the next, rotating around the locks 302-318).

In the example shown, the guide 330, along which the keys 320-328 translate, is centered around the location of the locks 302-318. However, in other examples, the guide 330 and the keys 320-328 may be located next to the locks 302-318, or in a different location on the login screen 300. The movement of the keys 320-328 on the login screen 300 decreases the ability to recreate a user's login pattern by tracing residue or other smudges.

FIG. 3c shows the guide 330 represented by a three-dimensional appearing wheel, which includes the keys 320-328 located on an outside a rim of the wheel. In the example shown, the guide 330 wheel and keys may be rotated, either automatically or by control of the user, such that the keys come into view as the wheel rotates and disappears on an opposite side of the wheel as the wheel continues to rotate. The wheel may accommodate an increased number of keys where only a portion of the plurality of keys is displayed at one time. As the keys rotate 320-328 to the front of the guide 330, the user may click and touch or click and drag the keys to the appropriate lock 302-318 to enter his/her login pattern. In the example shown, the wheel is in a vertical orientation located on the right side of the locks 302-318. However, in other examples, the wheel may be in any orientation (e.g., horizontal) and may be located anywhere around the locks 302-318. In other examples, more than one wheel may be used to display the keys.

FIG. 3d shows an alternative login screen with dynamic key locations 330a, 330b and 330c. In the example shown, the keys are arranged on the guides 330a, 330b and 330c similar to the guide 330 shown in FIG. 3c. However, in this example, the wheels are rotated to align the user's login pattern (e.g., similar to a slot machine display). In the example shown, the locks are represented by the area between lines 332a and 332b such that a user may spin the guides 330a, 330b and 330c until his or her login pattern is represented between the lines 332a and 332b. Once the user has arranged the wheels to show the proper authentication code, the user may hit enter or any similar key or otherwise indicate that the code should be verified including, for example, virtually pulling a slot machine lever.

Figure 4:
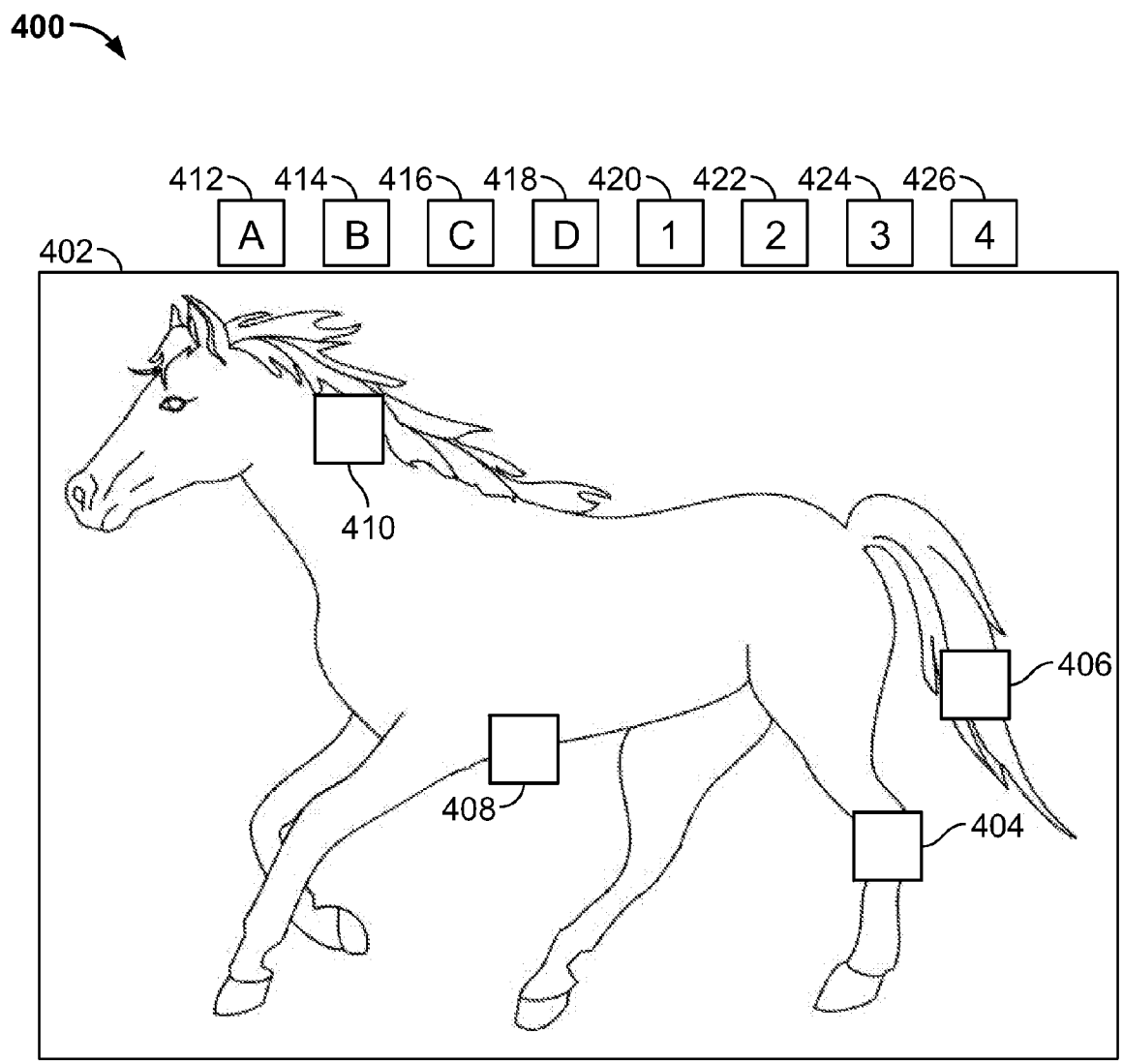
FIG. 4 illustrates an example login screen with a 2-D image for locks.

FIG. 4 illustrates an example of a login screen 400 comprising an image 402. In the example shown, the image 402 depicts a horse. In some examples, the system provides a plurality of images, including patterns, from which the user may choose when selecting his/her login screen. In other examples, the user may upload a custom image to be used as a login screen.

In the example shown, the login screen 400 includes locks 404, 406, 408 and 410 (e.g., square graphics on the image 402 with which a key may be associated). In the example shown, the locks are pre-arranged on the image 402. In some such examples, a user may choose an image the system will automatically generate a plurality of lock locations on the image. In other examples, the user may specify where the locks are to be located (e.g., the user may place a lock over the leg of the horse, over the tail, over the belly and over the neck).

After the locks have been arranged on the login screen 400, a user may create a login pattern including one or more keys and/or an order of the one or more keys. Similar to the login screens 200 and 300 described above, the keys and/or the locks may be represented symbolically by any icon, image, number, character (any language), color, two-dimensional geometric shape, and/or three-dimensional object model. As shown, keys 412, 414, 416, 418, 420, 422, 424 and 426 are displayed above the image 402, and each of the keys 412-426 represents a distinct or unique symbol. To associate a key with a lock, a user may touch the keys 412-426 (via an input device or touch screen) and drag the keys 412-426 into the locks 404-410 or the user may touch/click the keys 412-426 and then touch/click the corresponding lock(s) 404-410.

Figure 5:
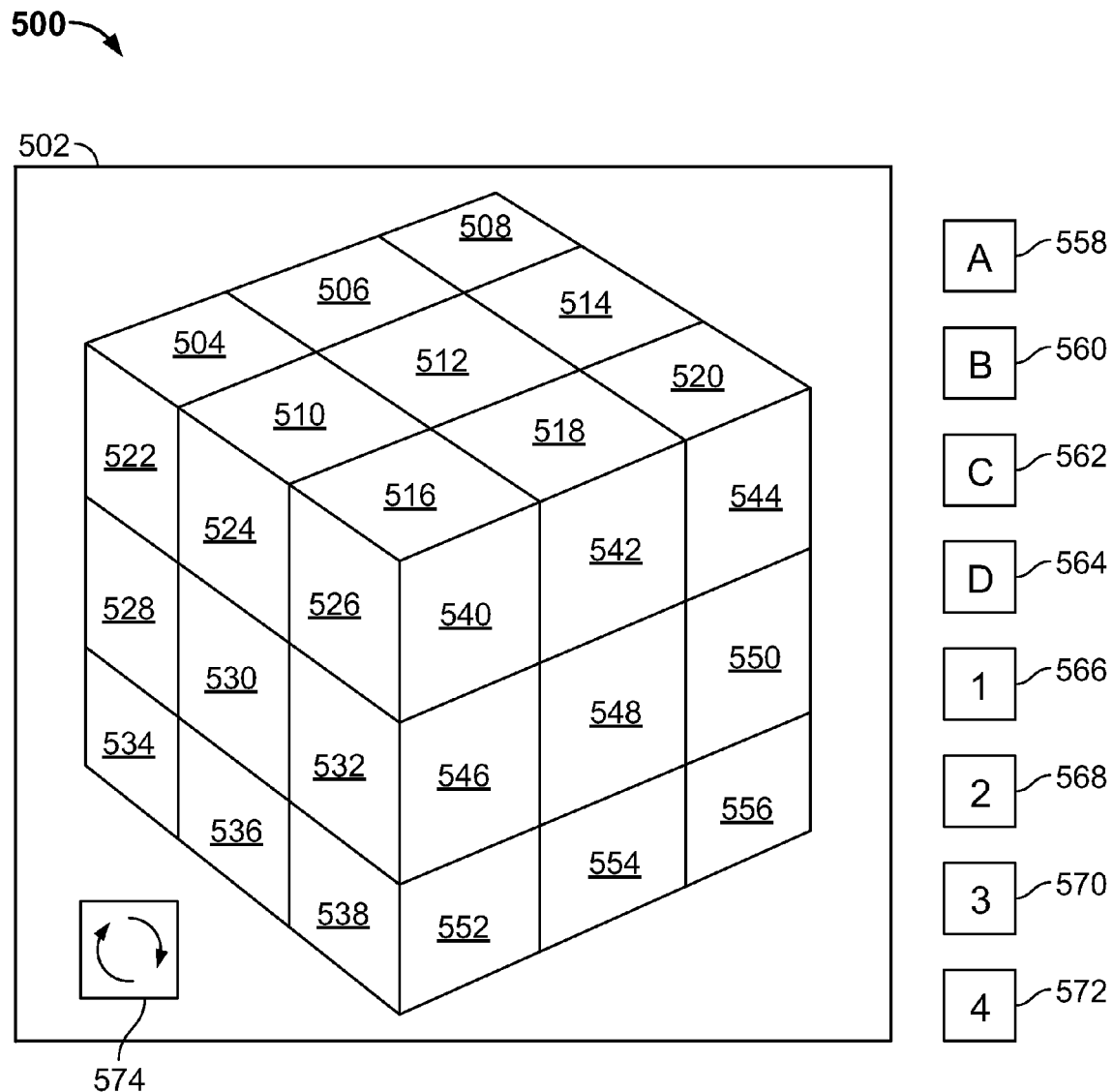
FIG. 5 illustrates an example login screen with a representation of a 3-D image for locks.

FIG. 5 illustrates an example login screen 500 including a representation of a 3-D appearing image 502 and a plurality of locks 504-556 (e.g., locations on the image with which keys may be associated) located on one or more sides of the 3-D appearing image 502 (e.g., adjacent the image 502). The user may rotate the 3-D appearing image 502 to present the different sides of the image and the corresponding locks. Keys 558-572 are presented adjacent the image and may associated with the locks 504-556 to create a login pattern and/or authenticating a user login after the login pattern has been created. In the example shown, a spin tool 574 allows a user to rotate and/or spin the 3-D appearing image 502 to view different sides of the 3-D appearing image 502.

While an example manner of implementing the system 100 and login screens 200, 300, 400 and 500 have been illustrated in FIGS. 1-5, one or more of the elements, processes and/or devices illustrated in FIGS. 1-5 may be combined, divided, re-arranged, omitted, eliminated and/or implemented in any other way. Further, the example user interface 102, the example input device 104, the example processor 106, the example lock generator 108, the example key generator 110, the example authentication module 112, the example login pattern database 114, the example login screen data 116, the example the tracking module 118 and/or, more generally, the example system 100 may be implemented by hardware, software, firmware and/or any combination of hardware, software and/or firmware. Thus, for example, any of the example user interface 102, the example input device 104, the example processor 106, the example lock generator 108, the example key generator 110, the example authentication module 112, the example login in pattern database 114, the example login screen database 116, the example the tracking module 118 and/or, more generally, the example system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example user interface 102, the example input device 104, the example processor 106, the example lock generator 108, the example key generator 110, the example authentication module 112, the example login pattern database 114, the example login screen database 116, and/or the example the tracking module 118 of the system 100 in FIG. 1 are hereby expressly defined to include a tangible computer readable medium such as a memory, DVD, CD, Blu-ray, etc. storing the software and/or firmware. Further still, the example manner of implementing the system 100 may include one or more elements, processes and/or devices in addition to, or instead of, those illustrated in FIG. 1, and/or may include more than one of any or all of the illustrated elements, processes and devices.

Figure 6:
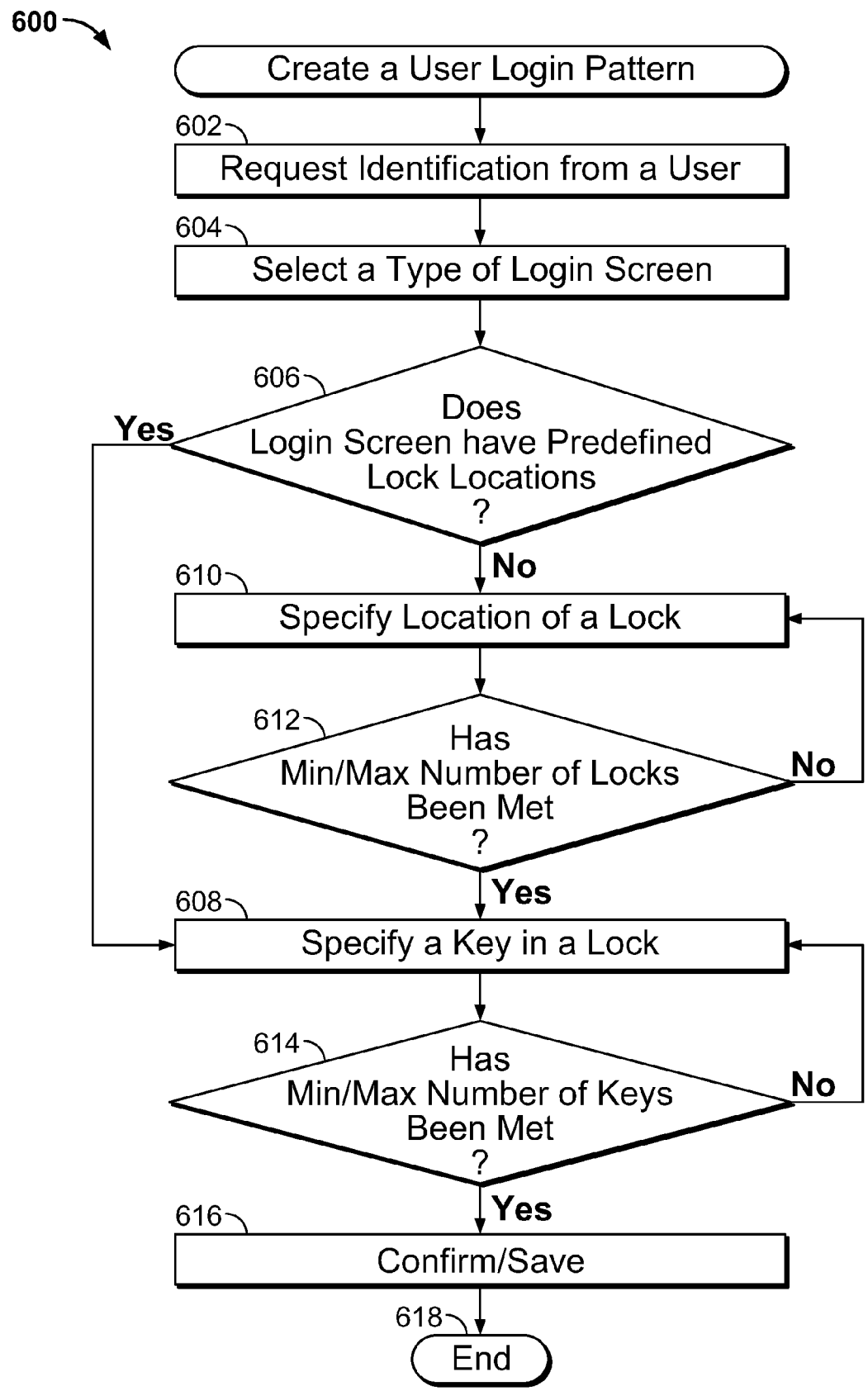
FIG. 6 is a flowchart representing an example method to create a user login pattern and/or code.
Figure 7:
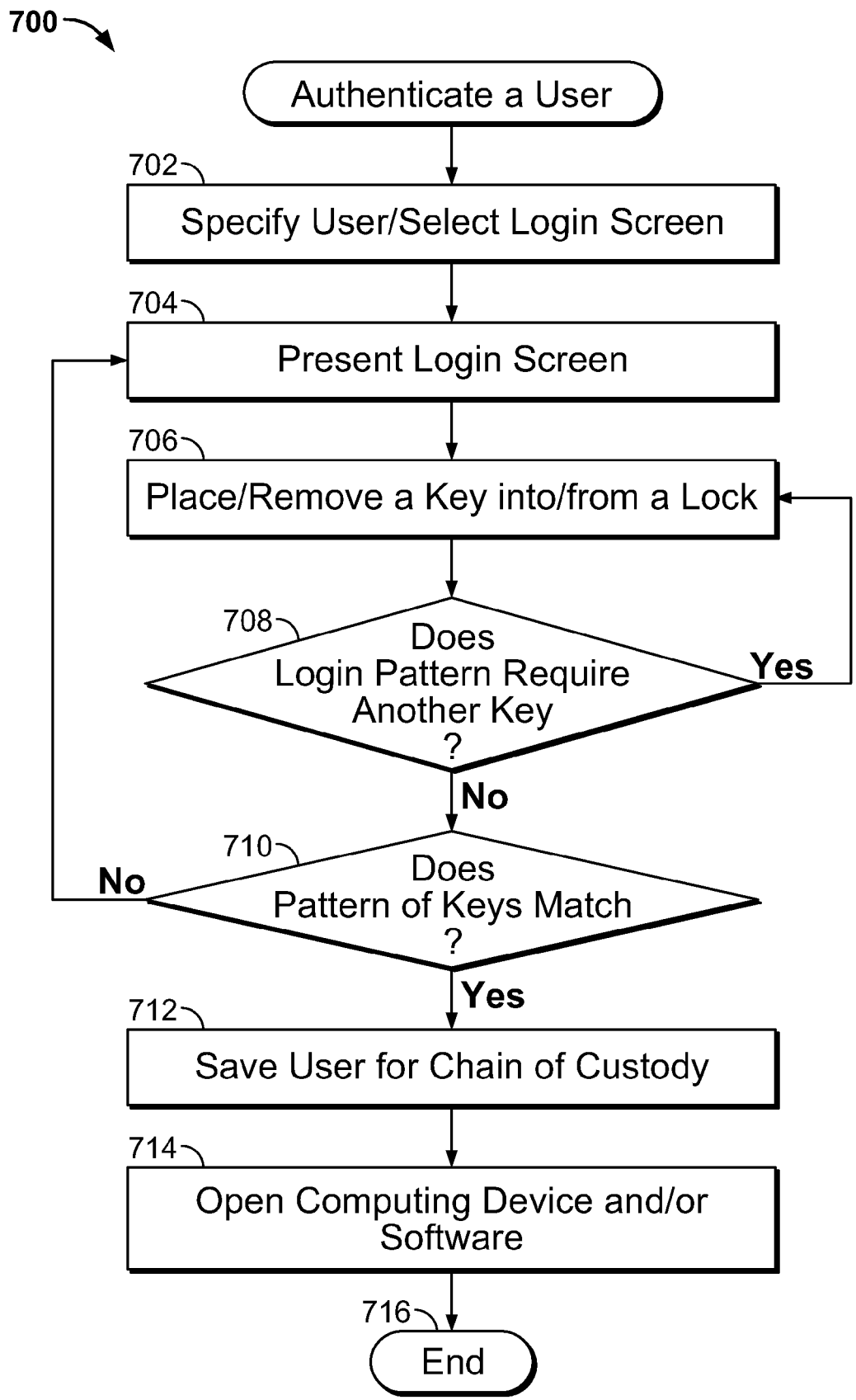
FIG. 7 is a flowchart representing an example method of authenticating a user login.

Flowcharts representative of example methods for implementing the system 100 of FIG. 1 are shown in FIGS. 6 and 7. In these examples, the methods may be implemented using a program for execution by a processor such as the processor 812 shown in the example computer 800 discussed below in connection with FIG. 8. The program may be embodied in software or machine readable and executable instructions stored on a tangible computer readable medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example methods are described with reference to the flowcharts illustrated in FIGS. 6 and 7, many other methods of implementing the example system 100 may alternatively be used. For example, the order of execution of the blocks may be changed, and/or some of the blocks described may be changed, eliminated, or combined.

As mentioned above, the example methods of FIGS. 6 and 7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example methods of FIGS. 6 and 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 6 is a flowchart illustrating an example method 600 to create a user login pattern and to implement the system 100 shown in FIG. 1 and/or the login screens 200, 300, 400 and 500 shown in FIGS. 2a-5. The example method 600 includes requesting a user name or other identification from a user (block 602). In the illustrated example, the user selects a specific login screen (block 604). In some examples, a generic login is used for all users and, therefore, the users do not have custom login screens. For example, all users may be presented with a 3×3 grid of locks to receive of one or more key(s). In such examples, block 604 may not form part of the example method 600.

The example method 600 involves determining if the user's login screen contains one or more predetermined lock locations (block 606). If the login screen contains one or more predetermined lock locations, the user specifies a key in a lock (block 608), as disclosed in further detail below. If the login screen does not have predetermined lock locations (block 606), the user specifies a location of a lock on the login screen (block 610). In some examples, the user is required to use a minimum number of locks (block 612). If the minimum number of locks has not been met (block 612), then the user is to specify another location of a lock on the login screen (block 610). In other examples, the user is limited by a maximum number of locks (block 612).

If the location of the locks is predetermined and/or the user has manually placed enough locks to meet the minimum/maximum requirements (block 612), the user specifies a key in a lock (block 608). In some examples, the user may place one or more keys in one or more locks. Stated differently, multiple keys may be used within each lock. Thus, in some examples, there is not a one-to-one correspondence between locks and keys. Also, in some examples, there is a minimum/maximum limit of keys to be incorporated into a login code and/or a minimum/maximum number of unique keys (block 614). If the minimum or maximum number has not been met, the user continues to match key(s) and lock(s) or remove key(s) from lock(s) if a maximum has been exceeded (block 608). In some examples, the user's login pattern includes associating the keys with their respective locks in a specific sequence or order. In some examples, the sequence includes associating a key with a lock and then subsequently disassociating that key with the lock.

In the illustrated example, if the user has met the minimum/maximum key requirements (block 614), the login pattern is saved (block 616). In some examples, the user is to repeat his/her login pattern to confirm the login pattern is correct (block 616). After saving and confirming the login pattern, the example method 600 ends (block 618).

FIG. 7 is a flowchart illustrating an example method to authenticate a user (block 700) and to implement the system 100 shown in FIG. 1 and/or the login screens 200, 300, 400 and 500 shown in FIGS. 2a-5. The example method 700 includes specifying an identification of a user and/or choosing the user's login screen (block 702). In some examples, the user identifies themselves via a username or avatar and the user is presented with his/her login screen. In other examples, a generic login is used for all the users. In some examples, multiple login screens (e.g., a 3×3 grid, a 4×4 grid, etc.) are presented to the user and the user chooses his/her login screen. In other examples, a generic login is used for all users without identifying the user and the user enters his/her password accordingly (i.e., a user just his/her login pattern and the system recognizes/identifies the user based on his/her login pattern).

In the illustrated example, the user is presented with the login screen (block 704). In some examples, as mentioned above, the login screen is unique to the user and the user chooses his/her name or other identification (e.g., from a list or from a dropdown menu). In other examples, the user chooses his/her identification from a plurality of representative avatars on a screen. In some examples, the user chooses his/her login screen from a plurality of login screens displayed on the screen at the same time. Once the user is identified, and/or the user has chosen his/her login screen, the user's login screen is presented (block 704). In other examples, as mentioned above, all the users have the same login screen but different login patterns unique to each user.

In the illustrated example, the user's login screen presents one or more locks and the user places a key into a lock (block 706). If the login pattern requires another key (block 708), the user continues to place keys into the lock locations (block 706) until his/her login pattern has been entered.

In some examples, the order in which the user places the keys into the locks is to match a predetermined order (e.g., sequence) in the login pattern (block 710). In some examples, the order includes associating a key with a lock and then subsequently disassociating that key with the lock (e.g., placing a key in a lock and then pulling it out of the lock). In the illustrated example, if the login pattern and/or the order of the login pattern are not entered correctly, the user is to start over to enter his/her login pattern into the login screen (block 704).

In the illustrated example, if the user has entered his/her login pattern and/or order of the login pattern correctly, the user is logged in and the user's identity is saved and associated with operation of the computing device and/or software application(s) and the chain of custody of the sample(s) (block 712), and the user is granted access to the computing device and/or software application(s) (block 714). In some examples, access is granted to the computing device and/or software application automatically when the user's login pattern is entered correctly. In other examples, the user enters his/her login pattern and performs an additional action (e.g., pressing ENTER, DONE, LOGIN). The user's identity may be saved by, for example, the tracking module 118 of the system 100 in FIG. 1. After opening the computing device and/or software application(s), the example method 700 ends (block 716).

Figure 8:
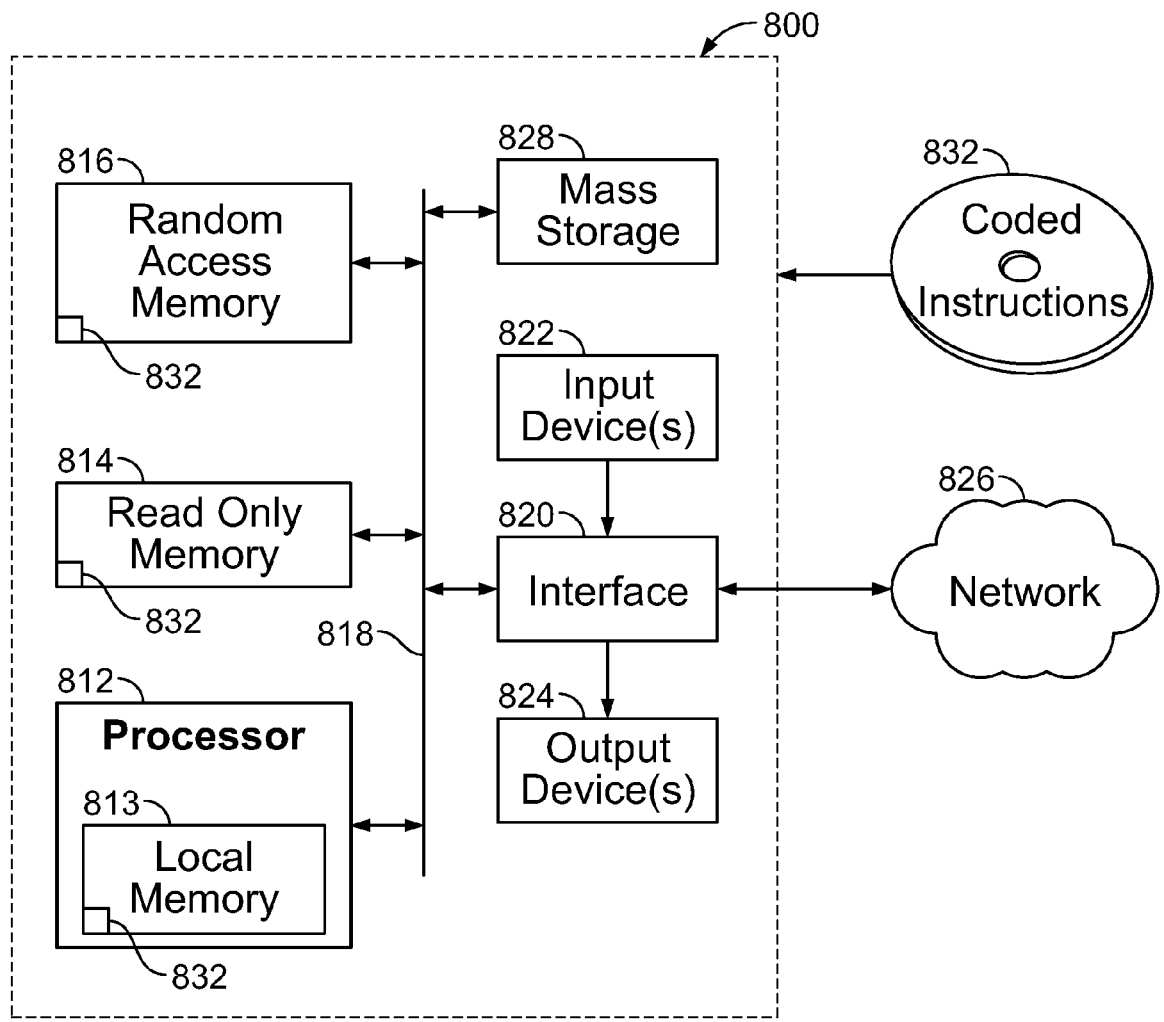
FIG. 8 illustrates an example processor platform that may be used to implement the example methods and/or apparatus disclosed herein.

FIG. 8 is a block diagram of an example computer 800 capable of executing machine readable instructions to implement the methods of FIGS. 6 and 7 and generally the system 100 of FIG. 1 and login screens 200, 300, 400 and 500 of FIGS. 2a-5. The computer 800 can be, for example, a server, a personal computer, a mobile phone (e.g., a cell phone), a personal digital assistant (PDA), an Internet appliance, a DVD player, a CD player, a digital video recorder, a Blu-ray player, a personal video recorder, or any other type of computing device.

The system 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The computer 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The computer 800 also includes one or more mass storage devices 828 for storing software and data. Examples of such mass storage devices 828 include floppy disk drives, hard drive disks, compact disk drives and digital versatile disk (DVD) drives. The mass storage device 828 may implement the login pattern database 114 and/or the login screen database 116.

Coded instructions 832 to implement the methods of FIGS. 6 and 7 may be stored in the mass storage device 828, in the volatile memory 814, in the non-volatile memory 816, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   displaying a plurality of selectable images on a display to a first user, each of the images having one or more lock locations;
   receiving a first selection of a first image of the plurality of selectable images by the first user;
   dynamically presenting a first set of symbols adjacent the first image;
   receiving a first code, the first code formed by a first arrangement of one or more of the first set of symbols on the one or more lock locations on the first image, wherein at least one of the one or more lock locations on the first image is to receive multiple symbols of a same or different type; and
   authenticating the first user based on (1) the selection of the first image from the plurality of selectable images and (2) the first code formed on the first image.

2. The method of claim 1 further comprising identifying the first user and displaying the plurality of selectable images based on the identification.

3. The method of claim 1, wherein one of the symbols is to be arranged on more than one of the lock locations on the first image.

4. The method of claim 1 further comprising displaying graphics to identify the one or more lock locations on the first image eligible to receive symbols.

5. The method of claim 1 further comprising dragging one or more of the first set of symbols to the one or more lock locations on the first image to form the first arrangement.

6. The method of claim 1 further comprising masking with a graphic one of the arranged symbols.

7. The method of claim 1 further comprising providing the authenticated first user access to one or more of a software application or a computer device.

8. The method of claim 1, wherein the symbols are to translate in a continuous motion along a defined path.

9. The method of claim 1, wherein the symbols are to translate in a discrete motion along a defined path.

10. The method of claim 1 further comprising:
    displaying the plurality of selectable images on the display to a second user;
    receiving a second selection of a second image of the plurality of selectable images by the second user;
    dynamically presenting a second set of symbols adjacent the second image;
    receiving a second code, the second code formed by a second arrangement of one or more of the symbols of the second set on the one or more lock locations on the second image; and
    authenticating the second user based on (1) the selection of the second image from the plurality of selectable images and (2) the second code formed on the second image.

11. The method of claim 1, wherein the dynamically presenting the first set of symbols adjacent the first image is in response to the first selection of the first image by the first user.

12. A method comprising:
    presenting a plurality of selectable images to a user on a screen, the images respectively having one or more lock locations;
    receiving a selection of a first one of the plurality of selectable images by the user;
    displaying the first image with the one or more lock locations in a first position on the screen;
    displaying a first set of key symbols in a first arrangement adjacent the first image;
    receiving a code comprising an association of at least one of the key symbols and at least one of the one or more lock locations on the first image, wherein at least two key symbols are associated with a same one of the lock locations;
    authenticating a user based on (1) the selection of the first image from the plurality of selectable images and (2) the code; and
    generating a custody record based on the authenticated user.

13. The method of claim 11, wherein the association comprises selecting a lock location and a key symbol.

14. The method of claim 11, wherein the code comprises associating a key with a lock and subsequently disassociating the key with the lock.

15. The method of claim 12 further comprising displaying the first set of key symbols in a second arrangement during a subsequent authentication process, the second arrangement different than the first arrangement.

16. The method of claim 12 further comprising displaying a second set of key symbols during a subsequent authentication process, the second set of key symbols different than the first set of key symbols and comprising at least the key symbols comprising the code.

17. The method of claim 12 further comprising displaying the first image in a second position of the screen different than the first position during a subsequent authentication process.

18. The method of claim 12 further comprising:
    requiring the code to comprise a fixed number of key symbols; and
    automatically authenticating the user once the number of keys has been entered.

19. An apparatus comprising:
a user interface to display a login screen to a user;
an input device to receive a command from the user; and
a processor communicatively coupled to the user interface, the processor to:
present a plurality of selectable images to the user via the user interface, the images having one or more lock locations;
receive a selection of a first image of the plurality of selectable images by the first user;
present a plurality of symbols to the user adjacent the first image via the user interface;
request the user, using the input device, to enter a code comprising matching one or more of the symbols to one or more of the lock locations on the first image, wherein to enter the code the user is to select one of the symbols and then subsequently select a plurality of different lock locations where the same symbol is to be matched;
authenticate the user based on (1) the selection of the first image from the plurality of selectable images and (2) the code, wherein at least one lock location is to be matched with more than one symbol; and
generate a custody record based on the authenticated user.

20. The apparatus of claim 19, wherein first image is a representation of a three-dimensional object and the lock locations are presented on the representation of the three-dimensional object and the user is to rotate the object to enter the code.

21. The apparatus of claim 19, wherein the code comprises a specific order of matching the one or more symbols to the one or more lock locations.

22. The apparatus of claim 19, wherein the code comprises a minimum number of lock locations.

23. The apparatus of claim 19, wherein the first image is displayed as a pattern on the user interface.

24. The apparatus of claim 19, wherein at least one of the lock locations is to be unmatched with one of the symbols.

25. The apparatus of claim 19, wherein one of the symbols is to be matched with one of the lock locations multiple times.

26. The apparatus of claim 19, wherein the code comprises a minimum number of unique symbols.

27. The apparatus of claim 19, wherein the code comprises a minimum number of unique locks.

28. An apparatus comprising:
a user interface to display a login screen to a user;
an input device to receive a command from the user; and
a processor communicatively coupled to the user interface, the processor to cause the user interface to:
present a plurality of lock locations on a representation of a three-dimensional object to the user;
present a plurality of symbols to the user;
present a request to the user to use the input device to enter a code comprising matching one or more of the symbols to one or more of the lock locations;
display a first side of the three-dimensional object;
display a first one of the symbols on a first one of the lock locations on the first side of the three-dimensional object in response to the user matching the first symbol to the first lock location;
display the three-dimensional object as rotating in response to user input, wherein the first symbol is to be displayed on the first side of the three-dimensional object as the three-dimensional object is rotating;
display a second side of the three-dimensional object different than the first side of the three-dimensional object; and
display a second one of the symbols on a second one of the locks on the second side of the three-dimensional object in response to the user matching the second symbol to the second lock.

* * * * *